(12) United States Patent
Zambri et al.

(10) Patent No.: US 10,839,836 B2
(45) Date of Patent: Nov. 17, 2020

(54) SLIDER TEST SOCKET

(71) Applicant: Seagate Technology LLC, Cupertino, CA (US)

(72) Inventors: Razman Zambri, Eden Prairie, MN (US); Stefan A. Weissner, Bloomington, MN (US); Rohit Deokar, Edina, MN (US); Brett R. Herdendorf, Mound, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/701,470

(22) Filed: Dec. 3, 2019

(65) Prior Publication Data

US 2020/0105296 A1 Apr. 2, 2020

Related U.S. Application Data

(62) Division of application No. 15/903,937, filed on Feb. 23, 2018, now abandoned.

(60) Provisional application No. 62/462,698, filed on Feb. 23, 2017.

(51) Int. Cl.
*G11B 5/48* (2006.01)
*G11B 5/455* (2006.01)
*G11B 27/36* (2006.01)

(52) U.S. Cl.
CPC ............. *G11B 5/484* (2013.01); *G11B 5/455* (2013.01); *G11B 5/4555* (2013.01); *G11B 5/4826* (2013.01); *G11B 27/36* (2013.01)

(58) Field of Classification Search
None
See application file for complete search history.

(56) References Cited

U.S. PATENT DOCUMENTS

| | | |
|---|---|---|
| 6,459,260 B1 | 10/2002 | Bonin et al. |
| 6,903,543 B2 | 6/2005 | Boutaghou et al. |
| 6,943,971 B2 | 9/2005 | Kainuma et al. |
| 7,453,670 B2 | 11/2008 | Takanuki et al. |
| 7,471,081 B2 | 12/2008 | Kainuma et al. |
| 7,497,006 B2 | 3/2009 | Davis et al. |
| 7,652,848 B2 | 1/2010 | Hagiya et al. |
| 7,719,796 B2 | 5/2010 | Takahashi et al. |
| 7,889,460 B2 | 2/2011 | Hanya et al. |
| 8,089,730 B1 | 1/2012 | Pan et al. |
| 8,134,804 B2 | 3/2012 | Honzawa et al. |
| 8,243,392 B2 | 8/2012 | Wakahara |
| 8,248,730 B2 | 8/2012 | Wakahara |
| 8,270,117 B2 | 9/2012 | Wakahara |
| 8,300,361 B2 | 10/2012 | Boutaghou et al. |
| 8,379,348 B2 | 2/2013 | Boutaghou et al. |
| 8,395,864 B2 | 3/2013 | Boutaghou et al. |

(Continued)

FOREIGN PATENT DOCUMENTS

| | | |
|---|---|---|
| JP | 2004118994 A | 4/2004 |
| JP | 2004227656 A | 8/2004 |

(Continued)

*Primary Examiner* — William J Klimowicz

(74) *Attorney, Agent, or Firm* — Faegre Drinker Biddle & Reath

(57) ABSTRACT

An apparatus includes a slider test socket. The slider test socket includes a clamp, which includes a body, a handle having an opening, and a plurality of arms that extend between the body at a first end of the clamp and the handle at a second end of the clamp.

16 Claims, 11 Drawing Sheets

(56) References Cited

U.S. PATENT DOCUMENTS

| | | |
|---|---|---|
| 8,514,522 B1 | 8/2013 | Pan et al. |
| 8,861,140 B1 | 10/2014 | Chen et al. |
| 8,947,651 B1 | 2/2015 | Thongrattana et al. |
| 9,401,164 B1 | 7/2016 | Thongrattana et al. |
| 9,412,411 B1 | 8/2016 | Rancour et al. |
| 9,449,643 B1 | 9/2016 | Rancour et al. |
| 9,514,781 B2 | 12/2016 | Anderson et al. |
| 9,715,896 B2 | 7/2017 | Rancour et al. |
| 9,715,897 B2 | 7/2017 | Rancour et al. |
| 9,858,954 B1 | 1/2018 | Saiki et al. |
| 2004/0036994 A1 | 2/2004 | Kainuma et al. |
| 2006/0072245 A1 | 4/2006 | Motonishi et al. |
| 2006/0236527 A1 | 10/2006 | Davis et al. |
| 2007/0002494 A1 | 1/2007 | Takahashi et al. |
| 2007/0183096 A1 | 8/2007 | Hagiya et al. |
| 2007/0263325 A1 | 11/2007 | Hanya et al. |
| 2009/0146653 A1 | 6/2009 | Kainuma et al. |
| 2009/0153994 A1 | 6/2009 | Merrow et al. |
| 2009/0251825 A1 | 10/2009 | Honzawa et al. |
| 2009/0297328 A1 | 12/2009 | Slocum, III |
| 2011/0007424 A1 | 1/2011 | Wakahara |
| 2011/0205670 A1 | 8/2011 | Wakahara |
| 2011/0267719 A1 | 11/2011 | Wakahara |
| 2012/0008225 A1 | 1/2012 | Boutaghou et al. |
| 2012/0033318 A1 | 2/2012 | Boutaghou et al. |
| 2016/0314813 A1 | 10/2016 | Anderson et al. |
| 2016/0314815 A1 | 10/2016 | Anderson et al. |
| 2018/0240480 A1 | 8/2018 | Zambri et al. |

FOREIGN PATENT DOCUMENTS

| | | | |
|---|---|---|---|
| JP | 2007012170 A | | 1/2007 |
| JP | 2009230814 A | | 10/2009 |
| JP | 2011108301 A | | 6/2011 |
| JP | 2011187105 A | * | 9/2011 |
| WO | 02100156 A2 | | 12/2002 |
| WO | 2005006332 A1 | | 1/2005 |
| WO | 2006116047 A2 | | 11/2006 |
| WO | 2012009163 A1 | | 1/2012 |
| WO | 2013023074 A1 | | 2/2013 |

* cited by examiner

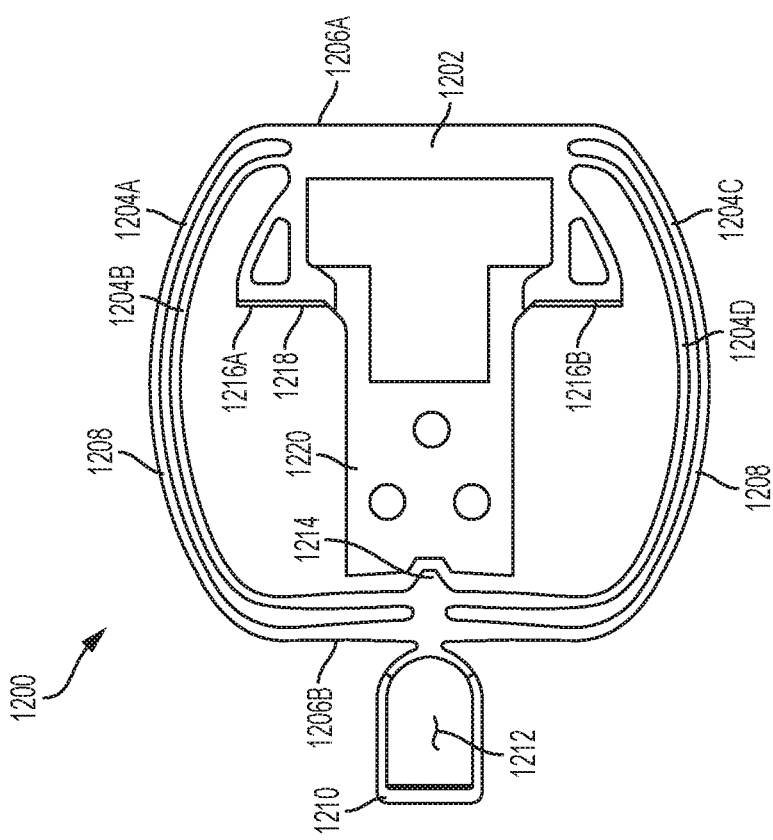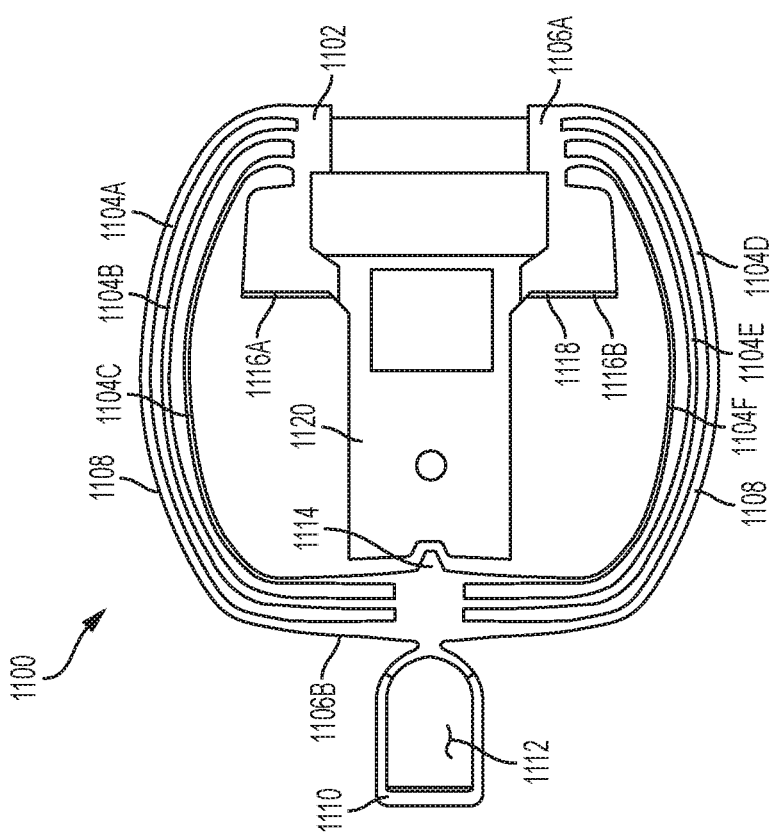

SLIDER TEST SOCKET

RELATED APPLICATIONS

This application is a Divisional application of U.S. patent application Ser. No. 15/903,937, filed on Feb. 23, 2018, which claims the benefit of U.S. Provisional Patent Application No. 62/462,698, filed on Feb. 23, 2017, the entireties of which are hereby incorporated by reference for all purposes.

TECHNICAL FIELD

Certain embodiments of the present disclosure are directed to devices and methods for use with data storage component testing systems.

BACKGROUND

Data storage component testing systems can test performance of one or more individual data storage components such as sliders and data storage media used in hard disk drives. Example data storage component testing systems include spin stands and test decks, which enable simultaneous testing of individual data storage components that are to be later installed in hard disk drives. Certain embodiments of the present disclosure are directed to methods and devices that assist with coupling and decoupling data storage components in testing systems.

SUMMARY

In certain embodiments, an apparatus includes a slider test socket. The slider test socket includes a clamp, which includes a body, a handle having an opening, and a plurality of arms that extend between the body at a first end of the clamp and the handle at a second end of the clamp.

In certain embodiments, an apparatus includes a slider test socket. The slider test socket includes a body coupled to an electrical connector and extending along a first plane. The slider test socket further includes a deflectable arm extending from the body along the first plane. The deflectable arm is configured to deflect to receive a slider and to retract to clamp the slider.

In certain embodiments, a method is described for use with a slider test socket having a body extending along a first plane and an arm extending from the body along the first plane. The method includes exerting a first force on the arm to deflect the arm in a first direction, placing a slider between the arm and the body, and releasing the first force on the arm to retract the arm such that the slider is clamped between the arm and the body.

BRIEF DESCRIPTION OF THE DRAWINGS

FIGS. 9-13 show top views of clamps that can be incorporated into slider test sockets, in accordance with certain embodiments of the present disclosure.

Figure 1:
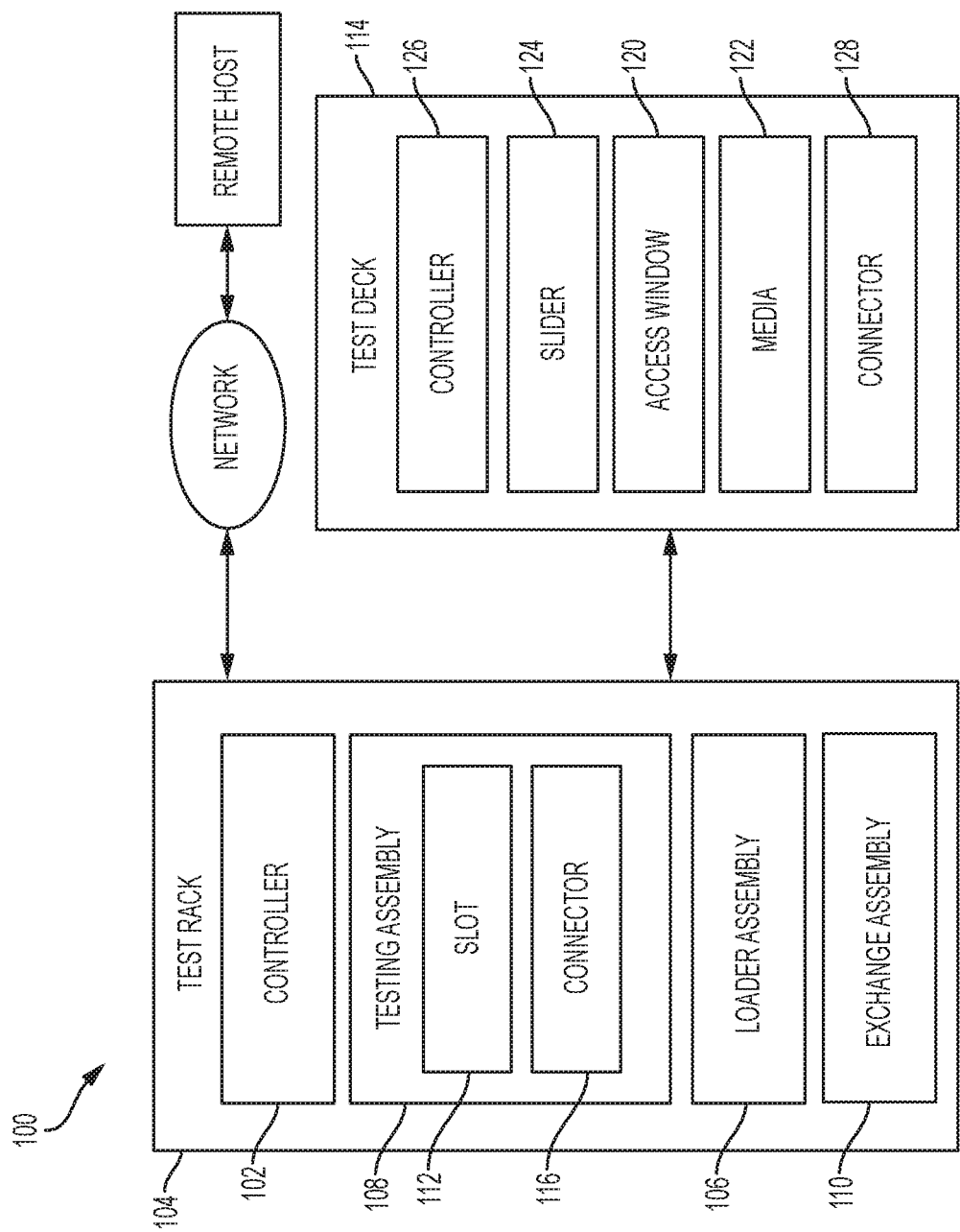
FIG. 1 shows a schematic of a data storage component testing system, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure are directed to devices and methods for use with data storage component testing systems. Example data storage component testing systems include spin stands and other test systems such as those disclosed in U.S. Pat. No. 9,449,643 (hereinafter the '643 patent), which is hereby incorporated by reference in its entirety.

FIG. 1 is a schematic representation of a data storage component testing system 100 having at least one controller 102, test rack 104, loader assembly 106, testing assembly 108, and exchange assembly 110. The testing assembly 108 has a plurality of test slots 112 that can be arranged vertically and horizontally to efficiently occupy physical space. The testing slots 112 are sized such that the data storage component testing system 100 can simultaneously provide different testing environments for data storage components corresponding with different hard drive form factors, such as 2.5" and 3.5" hard drives.

Figure 2:
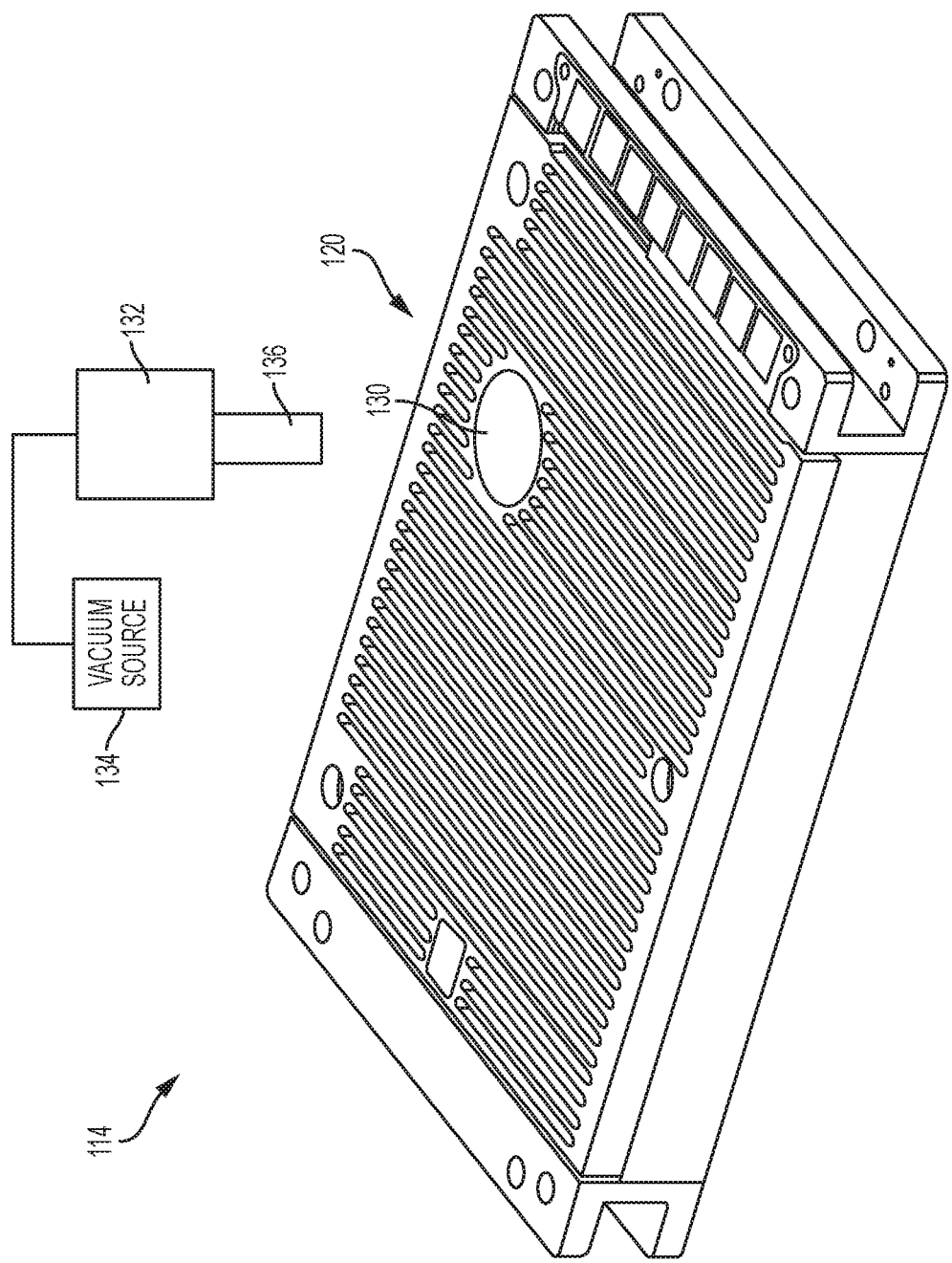
FIG. 2 shows a perspective view of a test deck for use in a data storage component testing system, in accordance with certain embodiments of the present disclosure.

The loader assembly 106 can have one or more robotic or manual rails, conveyors, end effectors, elevators, etc., that allow individual test decks 114 (shown in more detail in FIG. 2) to be installed and subsequently removed from the respective test slots 112. The ability to simultaneously test multiple test decks 114 positioned within the test slots 112 in the testing rack 104 allows for efficient testing of a large number of data storage components. The test deck 114 can include an access port 120, media 122, slide 124, controller 126, and connector 128, among other features and components.

The controller 126 is configured to store various testing routines that can be carried out while the test deck 114 is positioned within the test slot 112 to evaluate the quality and accuracy of the medium 122 and slider 124, for example. While in the test slot 112, the test deck 114 can be subjected to a variety of testing conditions including different temperature, vibration, data writing, data reading, fly height, internal gas composition, and internal gas pressure conditions. The test deck's various connectors 128 are configured to mechanically and/or electrically couple the test deck 114 to features in the test slot 112.

It is noted that the test deck 114 is not a consumer data storage device such as a hard drive but instead is a testing platform that enables simultaneous testing of individual data storage components, such as sliders and data storage media, that are to be later installed in hard drives. The test deck 114 includes an enclosed testing region accessed via the access port 120 (shown in FIGS. 1 and 2), which allows for efficient removal of tested data storage components and installation of untested components when compared to testing procedures requiring disassembly and assembly of data storage devices.

The exchange assembly 110 can be configured with manual or robotic means to engage and open the access port 120 of the test deck 114 before replacing one or more components housed within the test deck 114 and closing the access port 120. The access port 120 may include a door 130, which is configured to be opened and closed and which can reduce the risk of particulate generation and contamination in the enclosed testing region. It is noted that opening and closing the access port 120 via the door 130 can be accomplished pneumatically, hydraulically, and manually through friction, fasteners, and/or magnets.

The exchange assembly 110 can include one or more end effectors 132 (which can be coupled to a vacuum source 134) that can be moved within the exchange assembly and used to open and close the access port 120 and/or position a data storage component such as a slider in or out of the test deck 114. Using sliders as an example, the end effector 132 can pick up a to-be-tested slider and position itself above the access port 120. The door 130 of the access port 120 can be opened, and a tip 136 of the end effector 132 can be moved through the access port 120. The to-be-tested slider can be coupled and clamped to a slider test socket (described in more detail below) positioned in the test deck 114, and vacuum pressure can be removed to decouple the end effector 132 from the slider. In some embodiments, the vacuum pressure is maintained while the slider is being clamped to the slider test socket; in other embodiments, the vacuum pressure is released prior to clamping. Once the tip 136 of the end effector 132 is removed from the test deck 114, the door 130 of the access port 120 can be closed. The test deck 114 can then be transferred to a test slot 112, and the slider can undergo one or more testing routines. Once the slider has been tested, the test deck 114 can be transferred to the exchange assembly 110, where the door 130 of the access port 120 is opened to permit the end effector 132 to remove the slider from the test deck 114.

Some of the concerns when coupling the to-be-tested slider to a slider test socket are the position of the slider with respect to the slider test socket and the quality of the coupling force. For example, in the process of coupling the slider to the test socket, the slider may become undesirably rotated or tilted with respect to the slider test socket. Positioning errors can cause issues with mechanical and electrical coupling between the slider and slider test socket. Certain embodiments of the present disclosure are accordingly directed to methods and devices that assist with coupling sliders to slider test sockets.

Figure 3:
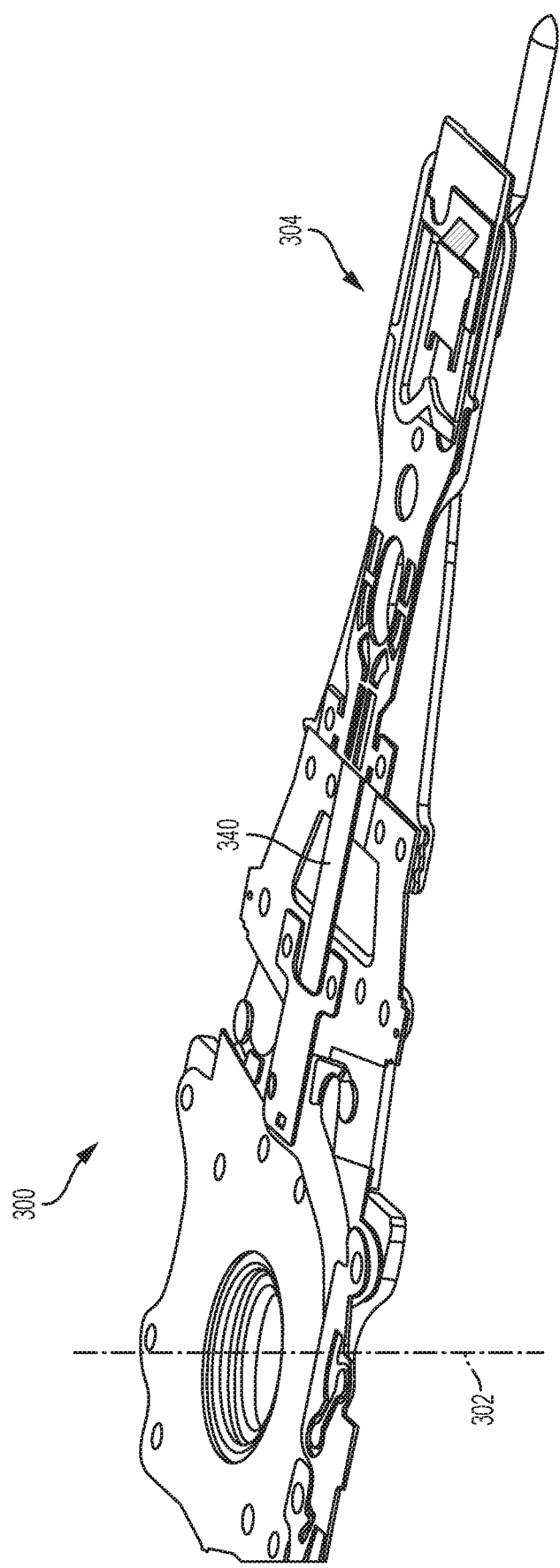
FIG. 3 shows a perspective view of an arm, in accordance with certain embodiments of the present disclosure.

FIG. 3 shows a perspective view of an arm 300 for use with a data storage component testing system, such as the system 100. As described above, data storage component testing systems can include test decks that house various data storage components—some of which are temporarily mounted to the test deck during testing. The arm 300 can be used in a test deck, such as the test deck 114 of shown in FIG. 2, and used to temporarily clamp sliders for testing. During testing, the arm 300 can be actuated to rotate around axis 302 to position a slider over a data storage medium for test data reading/writing operations.

Figure 4:
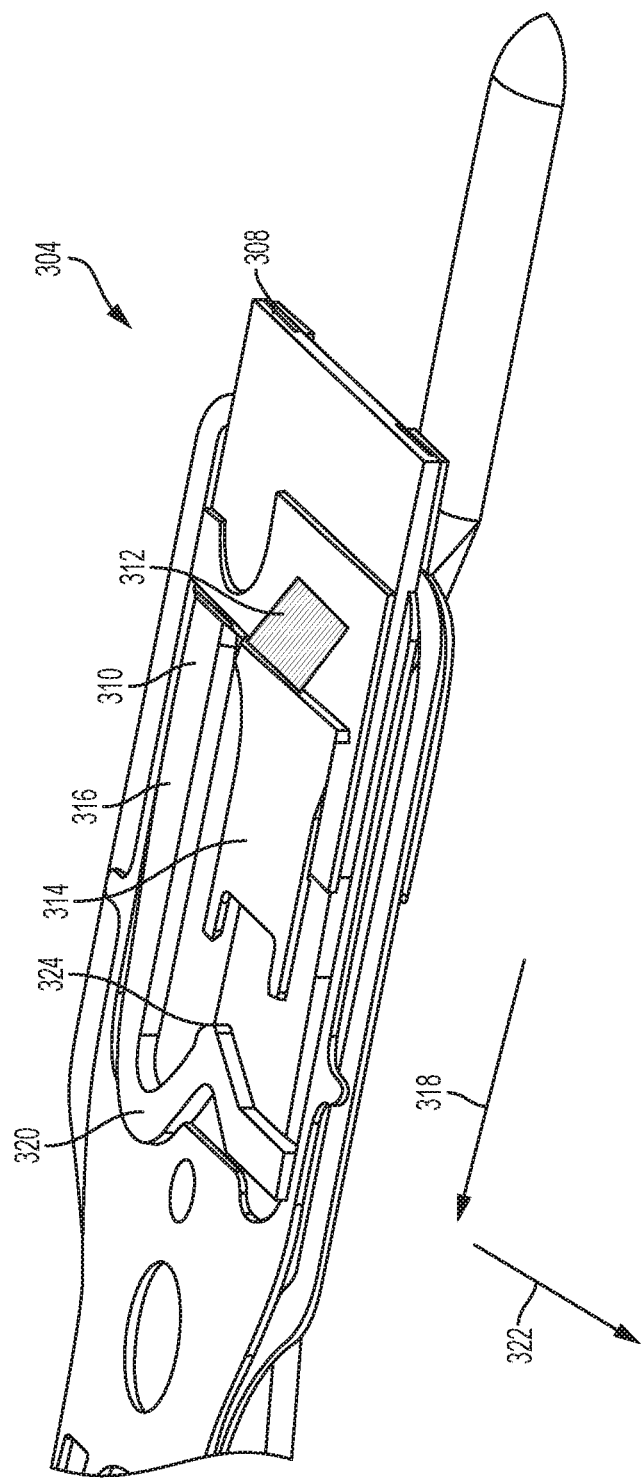
FIG. 4 shows a zoomed-in, perspective view of a slider test socket, in accordance with certain embodiments of the present disclosure.
Figure 5:
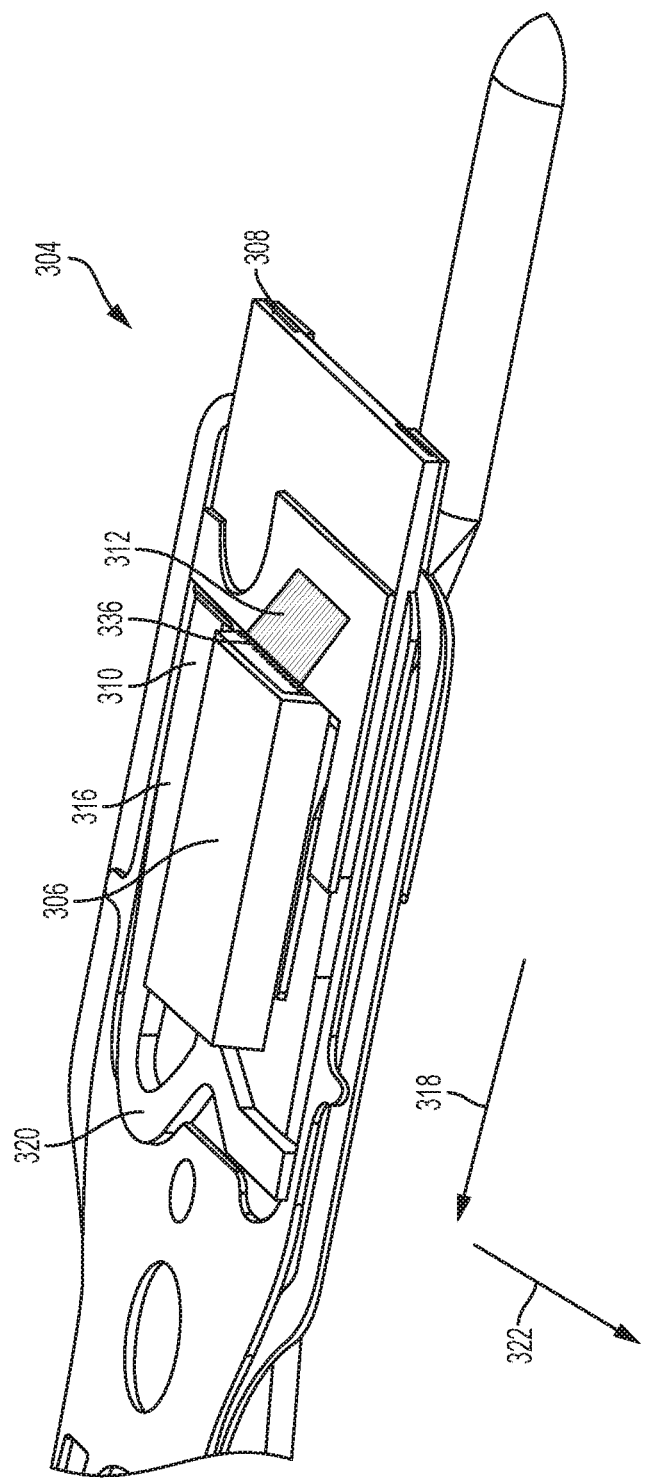
FIG. 5 shows a zoomed-in, perspective view of the slider test socket of FIG. 4 and a slider.
Figure 6:
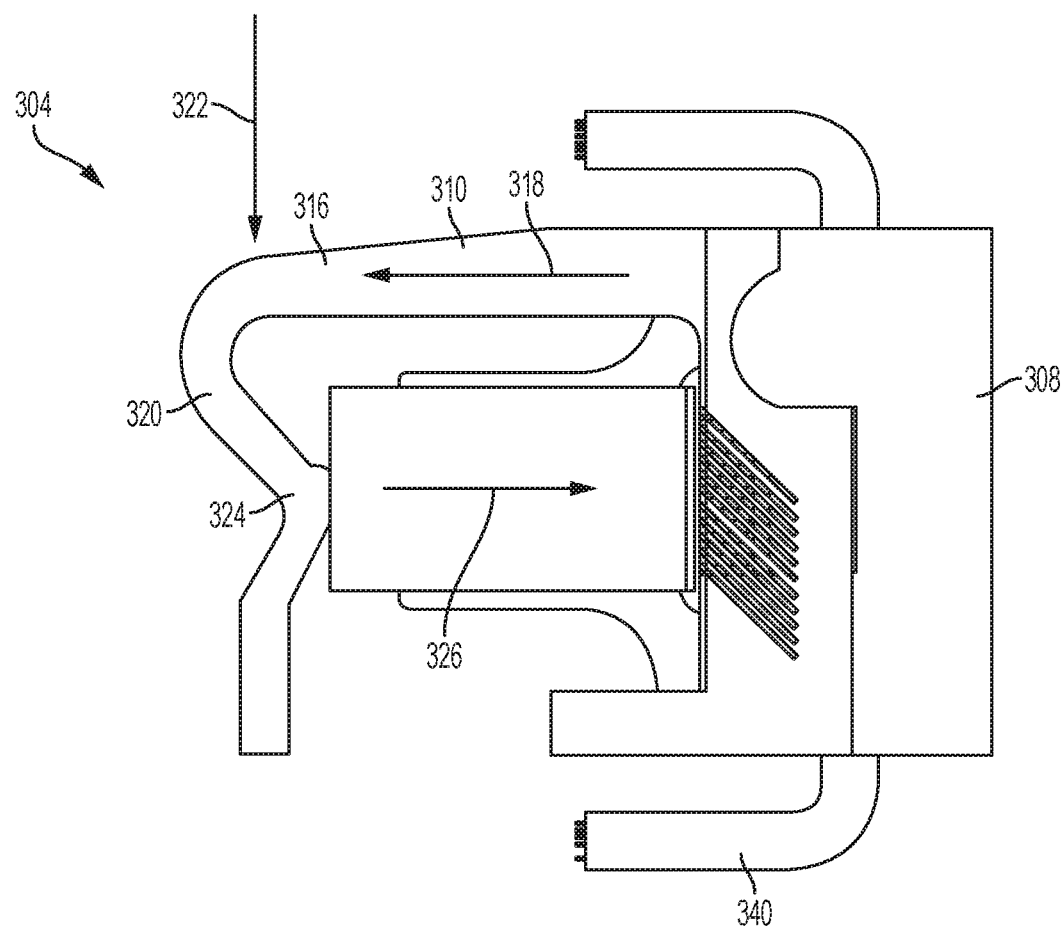
FIG. 6 shows a top view of the slider test socket and the slider of FIG. 5.
Figure 7:
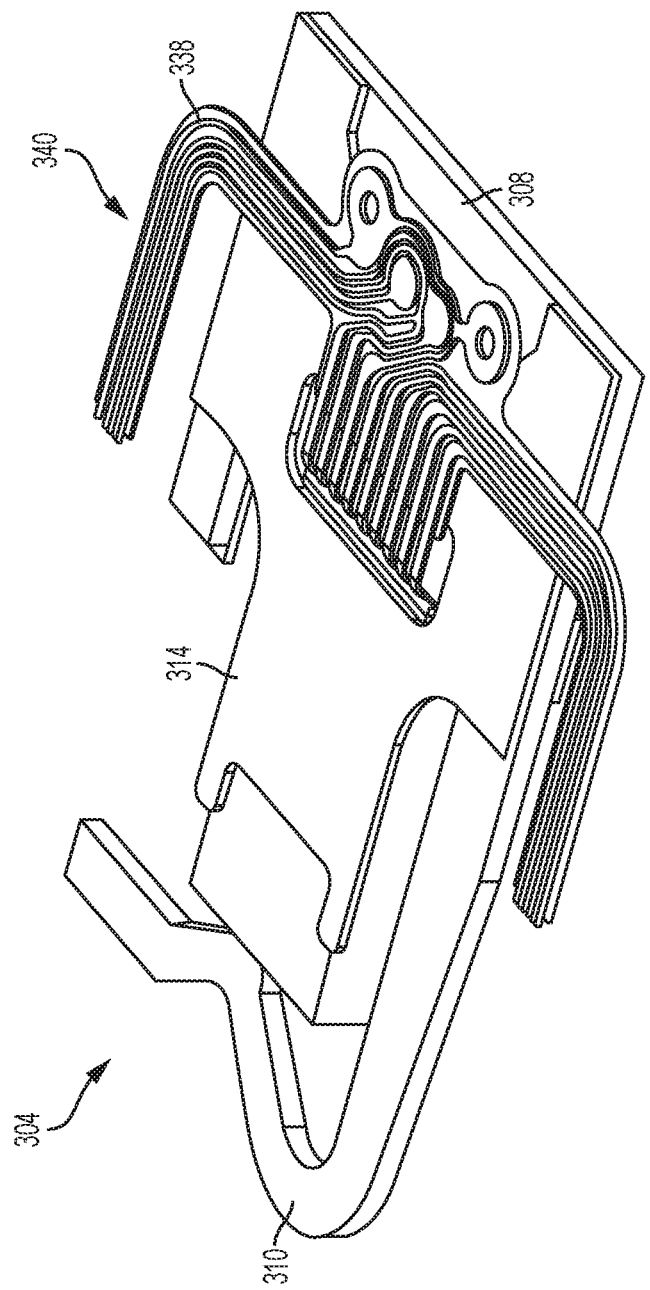
FIG. 7 shows a perspective, bottom view of the slider test socket and the slider of FIG. 6.

The arm 300 includes a slider test socket 304, which is positioned near a distal end of the arm 300. FIG. 4 shows a zoomed-in, perspective view of the slider test socket 304. FIG. 5 shows a zoomed-in, perspective view of the slider test socket 304 and a slider 306 clamped by the slider test socket 304. FIG. 6 shows a top view of the slider test socket 304 and the slider 306. FIG. 7 shows a perspective, bottom view of the slider test socket 304 and the slider 306.

The slider test socket 304 is configured to temporarily clamp sliders during testing in a data storage component testing system such as the data storage component testing system 100. When the slider 306 is properly clamped in the slider test socket 304, the slider 306 is mechanically and electrically coupled to the slider test socket 304.

As shown in FIG. 4, the slider test socket 304 includes a clamp (e.g., a body 308 and an arm 310), an electrical connector 312, and a shelf 314. The body 308 and the arm 310 can be a unitary structure and can be made of materials comprising stainless steel, copper, elastomers, etc., which permit the arm 310 to deflect in response to an exerted force. A body and arm made of a unitary structure can allow for the slider test socket 304 to be designed with tighter tolerances over multi-piece structures because the unitary structure eliminates the need to address tolerances due to welds, fasteners, etc. The arm 310 extends from the body 308 along a plane and can take various shapes. In some embodiments, like those shown in FIGS. 4-7, the arm 310 is substantially L-shaped such that the arm 310 includes a first portion 316 that extends from the body 308 in a first direction 318 and a second portion 320 that extends from the first portion 316 in a second direction 322 that is perpendicular to the first direction 318. Together, the body 308 and the arm 310 form a C-clamp-like structure for clamping sliders.

Figure 8:
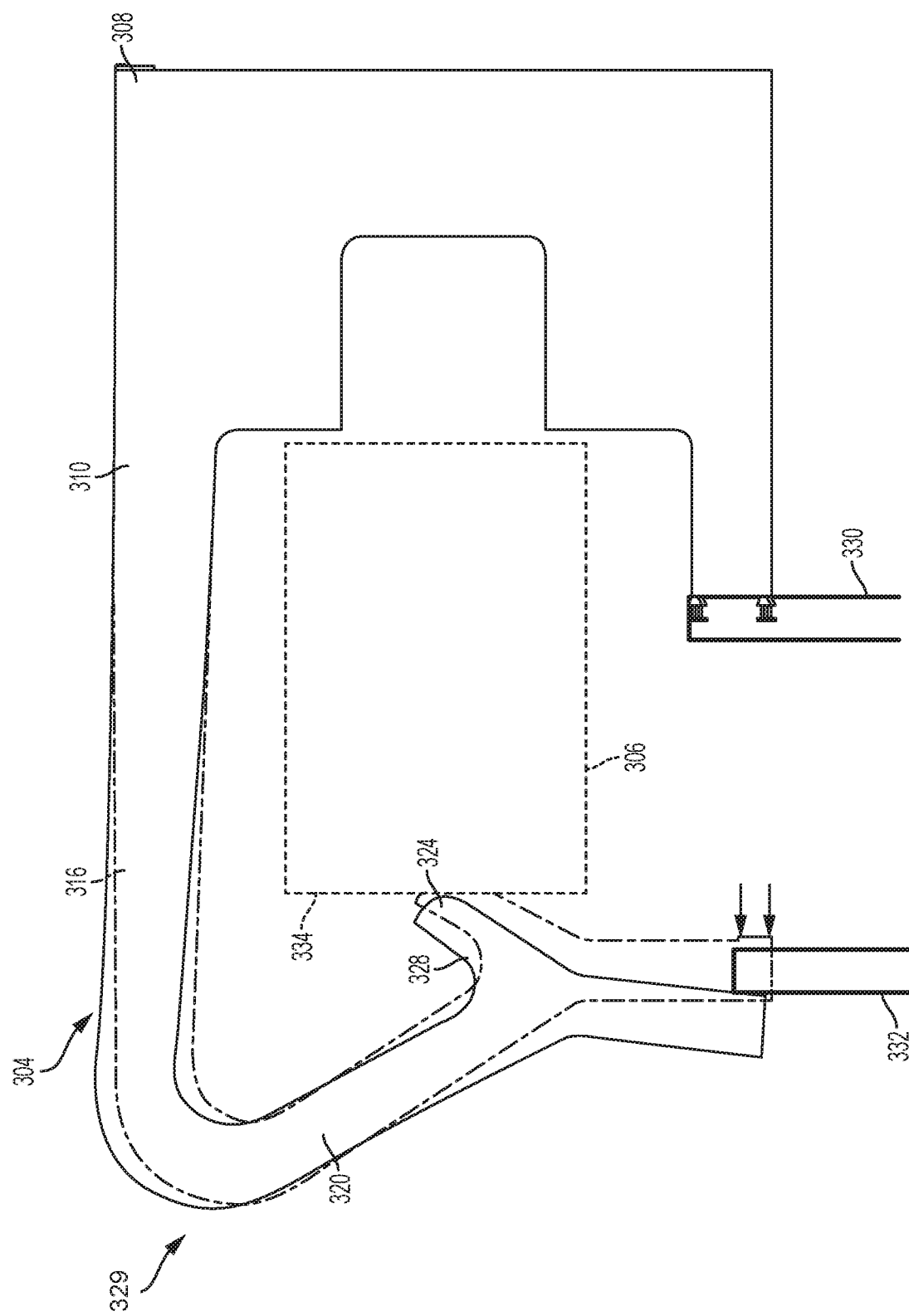
FIG. 8 shows a slider test socket during deflection, in accordance with certain embodiments of the present disclosure.

The slider 306 can be mechanically coupled to the slider test socket 304 in a variety of ways. FIGS. 5-7 show the slider 306 in a clamped position where the slider 306 is positioned and mechanically coupled between the body 308 and the arm 310. More specifically, FIG. 6 shows that the arm 310 includes a contact feature 324 that extends towards the body 308 and directly contacts one side of the slider 306 at or near a central longitudinal axis 326 of the slider 306 while the opposite side of the slider 306 contacts the body 308. The contact feature 324 can take a variety of shapes. For example, FIGS. 3-7 show the contact feature 324 being a bump-like shape. FIG. 8 shows the contact feature 324 being formed by a leg 328 protruding from the arm 310. More specifically, FIG. 8 shows the arm 310 having a Y-shaped portion 329 where one of the legs 328 of the Y-shape is the contact feature 324.

In some embodiments, the contact feature 324 includes a single, discrete contact point that is configured to contact the slider 306. In some embodiments, the contact feature 324 includes a flat surface, which lies against and contacts the slider 306. In some embodiments, the arm 310 includes multiple contact features. In such embodiments, the contact features may be positioned to contact the slider away from the slider's central longitudinal axis 326 and/or at equal distances from the central longitudinal axis 326.

As mentioned above, the slider test socket 304 is configured to temporarily clamp sliders during testing. In the process of clamping a slider, the test deck 114 can be provisioned with at least one member that is configured to exert a force on the body 308 and/or arm 310 to deflect the arm 310. FIG. 8 shows a first member 330 and a second member 332 positioned in a gap between the body 308 and the arm 310. The first and second member, 330 and 332, can be configured to exert a force against the body 308 and the arm 310, respectively. In some embodiments, the first and second members, 330 and 332, comprise shape-memory alloys or are actuated by one or more shape-memory alloys. In some embodiments, the first member 330 and the second member 332 are actuated to exert their respective forces against the body 308 and the arm 310 upon the test deck's door 130 opening. In some embodiments, first and second members are actuated upon the test deck 114 being powered on in the exchange assembly 110.

FIG. 8 shows the arm 310 in a deflected state such that the slider 306 can be positioned between in the body 308 and the arm 310. Upon placing the slider 306 between the arm 310 and the body 308 in a clamping space 334, one or more of the forces exerted by the first and second members, 330 and 332, can be released and the arm 310 retracts to its normal state. When the one or more forces are released, the contact feature 324 contacts the slider 306 and exerts a force such that the slider 306 becomes mechanically coupled between the body 308 and the arm 310. In some embodiments, the arm 310 and the contact feature 324 are designed such that the contact feature 324 moves along a straight line as the arm 310 is deflected and retracted. This arrangement mitigates alignment and positioning problems as the slider 306 is clamped because the contact feature 324 contacts the slider and exerts a force directly towards the body 308 with little to no rotational force. In some embodiments, the force exerted by the contact feature 324 is directed along the central longitudinal axis 326 of the slider 306. In some embodiments, the contact feature 324 provides a uniform force for coupling to the electrical connector 312.

Once the slider 306 is mechanically coupled to the slider test socket 304, the slider can be electrically coupled to the electrical connector 312. For example, one of the first and second members, 330 and 332, can exert a force against the electrical connector 312 to retract the electrical connector 312 away from the slider 306 while the slider 306 is being positioned in and mechanically coupled to the slider test socket 304. Once the slider 306 is mechanically coupled to the slider test socket 304, the force against the electrical connector 312 from one of the of the first and second members, 330 and 332, can be released such that the electrical connector 312 moves towards the slider 306 and electrically couples to the slider 306. Mechanically coupling the slider 306 to the slider test socket 304 before electrically coupling the slider 306 to the electrical connector 312 helps mitigate positioning errors of the slider 306 with respect to the slider test socket 304. For example, using the above-described approach, the slider 306 is less likely to become misaligned or lifted by the action of electrically coupling the slider 306 to the electrical connector 312. Conversely, in some embodiments, the slider test socket 304 is configured such that electrical connector 312 becomes electrically uncoupled from the slider 306 before the slider 306 is mechanically uncoupled from the slider test socket 304.

As shown in FIG. 5, the slider 306 includes bond pads 336 that are configured to be electrically coupled to corresponding conductors on the electrical connector 312. The electrical connecter 312 can take the form of a variety of types of connectors that configured to mechanically and electrically couple to the bond pads 336. For example, the electrical connecter 312 can be a flex circuit, featherboard-like connector, etc., and have electrical conductors such as pins that couple to the bond pads 336. Each electrical conductor forms part of or is coupled to conductors 338 (shown in FIG. 7) that communicate signals to and from the slider 306. The conductors 338 can be part of a flex circuit 340 that extends from the slider test socket 304 along the arm 310 to the test deck's controller 126.

FIGS. 9-13 show top views of various designs of clamps that can be incorporated into slider test sockets. These clamps can be used to mechanically couple and decouple sliders to and from slider test sockets. In certain embodiments, these clamps can be a unitary structure and can be made of metals, metal alloys, or elastomers. For example, materials can comprise stainless steel, copper (including copper alloys), nickel (including nickel alloys like nickel-cobalt), palladium, cobalt, titanium, aluminum, bronze, brass, etc., which permit the arm 310 to deflect in response to an exerted force. In certain embodiments, the material is chosen to have a yield strength that is greater than applied stresses caused by opening the clamps when positioning a slider within the clamp. In certain embodiments, the clamps are designed to be opened 120-150 µm without exceeding the yield strength of the chosen material(s) of the clamps.

Figure 9:
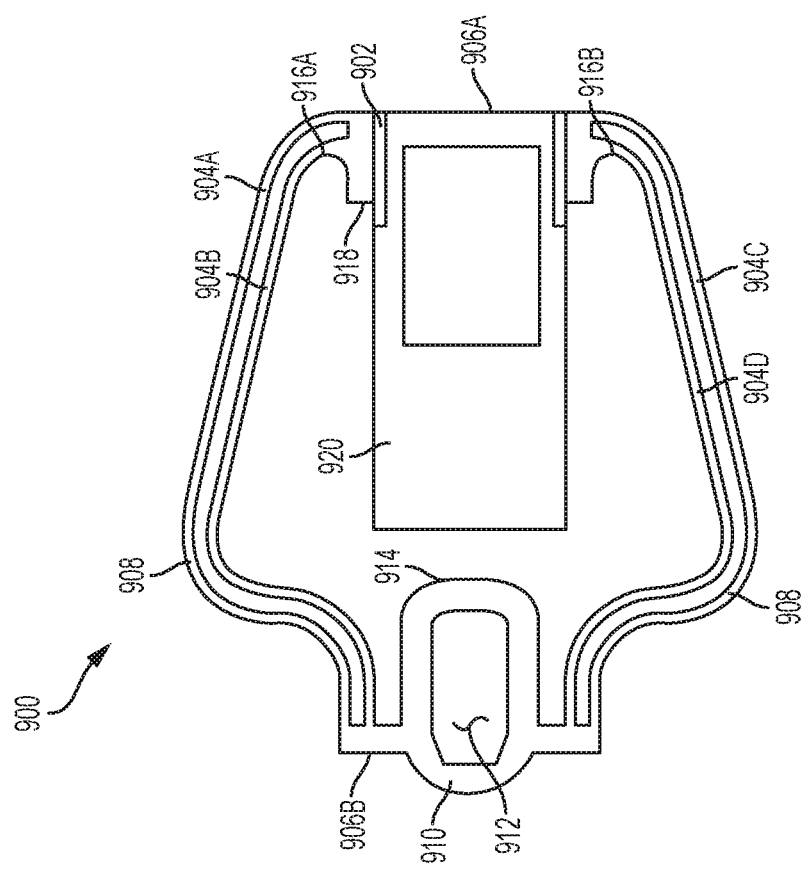

FIG. 9 shows a clamp 900 including a body 902 and a plurality of arms (i.e., a first arm 904A, a second arm 904B, a third arm 904C, and a fourth arm 904D) that extends between a trailing end 906A (which corresponds with a trailing edge of a slider) and a leading end 906B (which corresponds with a leading edge of a slider) of the clamp 900. As shown in FIG. 9, the first arm 904A and the second arm 904B are paired on one side of the clamp 900 with a gap therebetween, and the third arm 904C and the fourth arm 904D are paired on the other side of the clamp 900 with a gap therebetween. The arms are similarly shaped such that the arms extend from the trailing end 906A and extend away from the body 902 until respective curved portions 908 of the arms. At the curved portion 908, the arms extend back towards the body 902 until terminating at the leading end 906B. As shown in FIG. 9, the arms extend around at least a portion of the body 902. Although FIG. 9 shows the arms extending along the clamp in pairs, fewer or more arms can be used. For example, additional arms can be used to increase the clamping force of the clamp 900.

The clamp 900 includes—at or near the leading end 906B—a handle 910 with an opening 912 and a contact feature 914. The clamp 900 also includes opener surfaces 916A and 916B on the second arm 904B and the fourth arm 904D, respectively. Near the trailing end 906A, the clamp 900 includes a slider support surface 918. The clamp 900 also includes a shelf 920.

To couple a slider to the clamp 900, a first member of the test deck 114 can extend through the opening 912 in the handle 910 and a second member of the test deck 114 can couple to one or both of the opener surfaces 916A and 916B. Once positioned, the members can exert a force to create a larger gap between the contact feature 914 and the slider support surface 918. The shape of the arms allows the clamp 900 to lengthen such that a slider can be positioned on the shelf 920 and between the contact feature 914 and the slider support surface 918. Once the slider is positioned, the members can remove the force against the opening 912 and the opener surfaces 916A and 916B such that the contact feature 914 and the slider support surface 918 couple to the slider. A similar process can be used with the clamps shown in FIGS. 10-13.

Figure 10:
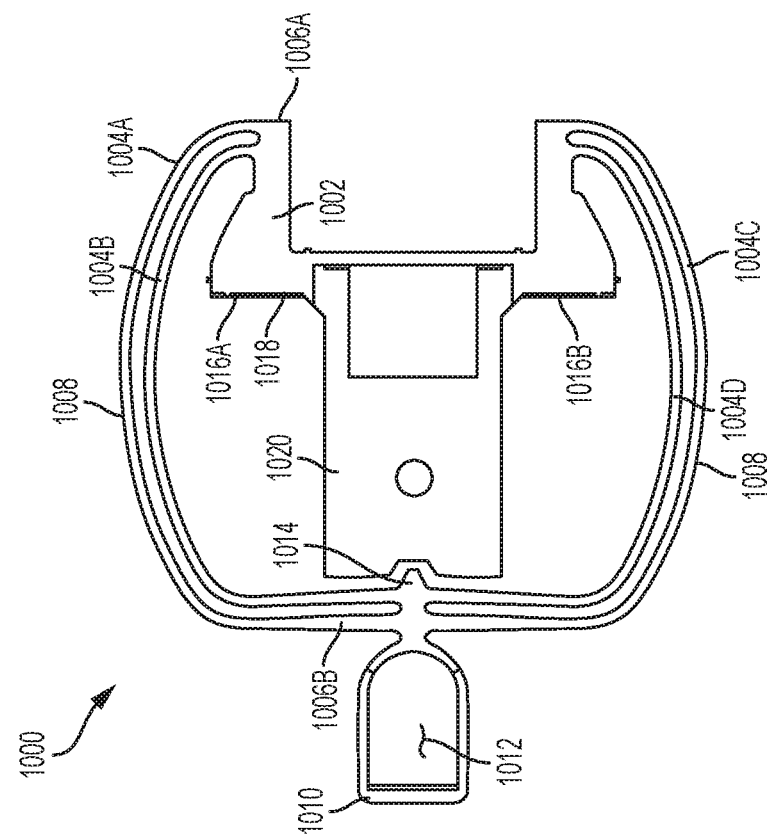

FIG. 10 shows a clamp 1000 including a body 1002 and a plurality of arms (i.e., a first arm 1004A, a second arm 1004B, a third arm 1004C, and a fourth arm 1004D) that extends between a trailing end 1006A and a leading end 1006B of the clamp 1000. As shown in FIG. 10, the first arm 1004A and the second arm 1004B are paired on one side of the clamp 1000 with a gap therebetween, and the third arm 1004C and the fourth arm 1004D are paired on the other side of the clamp 1000 with a gap therebetween. The arms are similarly shaped and form a curve (e.g., curved portion 1008) as they extend from the trailing end 1006A to the leading end 1006B. The arms terminate at a handle 1010 at the leading end 1006B. The handle 1010 includes an opening 1012 and a contact feature 1014. The clamp 1000 also includes opener surfaces 1016A and 1016B on the body 1002. Near the trailing end 1006A, the clamp 1000 includes a slider support surface 1018. The clamp 1000 also includes a shelf 1020. As shown in FIG. 10, the arms extend around at least a portion of the body 1002. Although FIG. 10 shows the arms extending along the clamp in pairs, fewer or more arms can be used. For example, additional arms can be used to increase the clamping force of the clamp 1000.

FIG. 11 shows a clamp 1100 including a body 1102 and a plurality of arms (i.e., a first arm 1104A, a second arm 1104B, a third arm 1104C, a fourth arm 1104D, a fifth arm 1104E, and a sixth arm 1104F) that extends between a trailing end 1106A and a leading end 1106B of the clamp 1100. As shown in FIG. 11, the first arm 1104A, the second arm 1104B, and the third arm 1104C form a first trio of arms on one side of the clamp 1100 with gaps therebetween, and the fourth arm 1104D, the fifth arm 1104E, and the sixth arm 1104F form a second trio of arms on the other side of the clamp 1100 with gaps therebetween. The arms are similarly shaped and form a curve (e.g., curved portion 1108) as they extend from the trailing end 1106A to the leading end 1106B. The arms terminate at a handle 1110 at the leading end 1106B. The handle 1110 includes an opening 1112 and a contact feature 1114. The clamp 1100 also includes opener surfaces 1116A and 1116B on the body 1102. Near the trailing end 1106A, the clamp 1100 includes a slider support surface 1118. The clamp 1100 also includes a shelf 1120. As shown in FIG. 11, the arms extend around at least a portion of the body 1102. Although FIG. 11 shows the arms extending along the clamp in trios, fewer or more arms can be used. For example, additional arms can be used to increase the clamping force of the clamp 1100.

FIG. 12 shows a clamp 1200 including a body 1202 and a plurality of arms (i.e., a first arm 1204A, a second arm 1204B, a third arm 1204C, and a fourth arm 1204D) that extends between a trailing end 1206A and a leading end 1206B of the clamp 1200. As shown in FIG. 12, the first arm 1204A and the second arm 1204B are paired on one side of the clamp 1200 with a gap therebetween, and the third arm 1204C and the fourth arm 1204D are paired on the other side of the clamp 1200 with a gap therebetween. The arms are similarly shaped and form a curve (e.g., curved portion 1208) as they extend from the trailing end 1206A to the leading end 1206B. The arms terminate at a handle 1210 at the leading end 1206B. The handle 1210 includes an opening 1212 and a contact feature 1214. The clamp 1200 also includes opener surfaces 1216A and 1216B on the body 1202. Near the trailing end 1206A, the clamp 1200 includes a slider support surface 1218. The clamp 1200 also includes a shelf 1220. As shown in FIG. 12, the arms extend around at least a portion of the body 1202. Although FIG. 12 shows the arms extending along the clamp in pairs, fewer or more arms can be used. For example, additional arms can be used to increase the clamping force of the clamp 1200.

Figure 13:
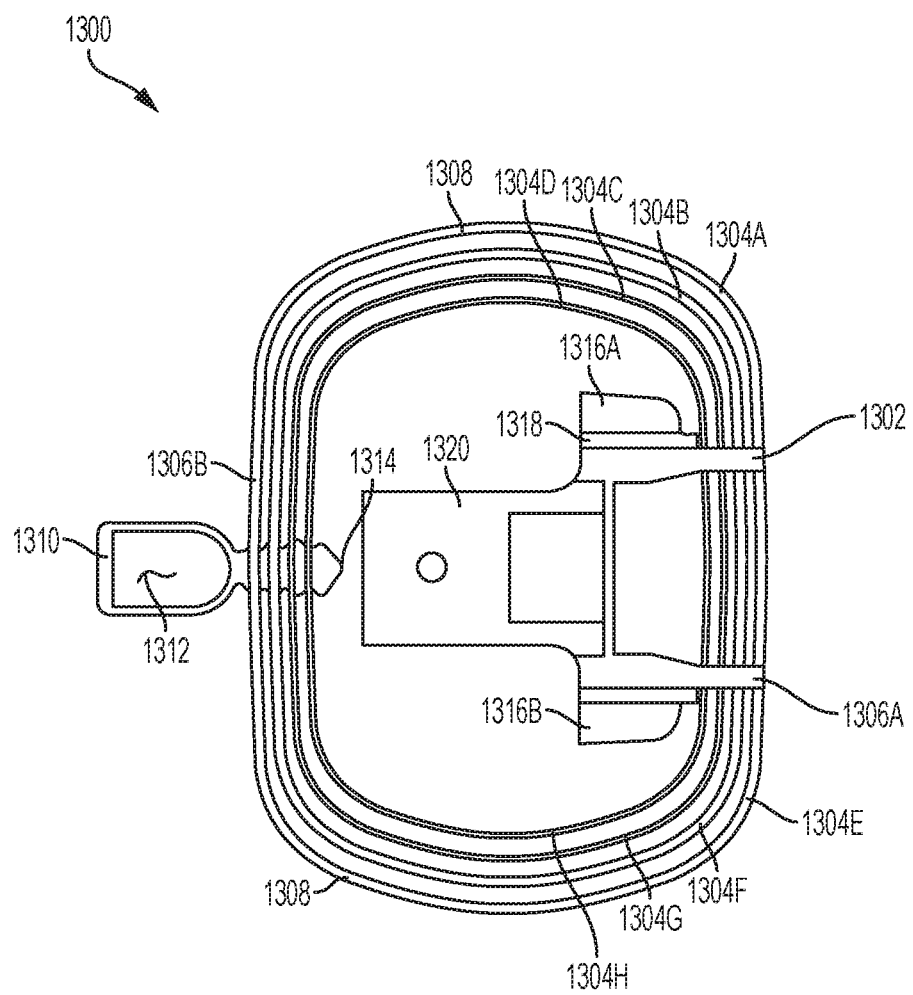

FIG. 13 shows a clamp 1300 including a body 1302 and a plurality of arms (i.e., a first arm 1304A, a second arm 1304B, a third arm 1304C, a fourth arm 1304D, a fifth arm 1304E, a sixth arm 1304F, a seventh arm 1304G, and an eighth arm 1304H) that extends between a trailing end 1306A and a leading end 1306B of the clamp 1300. As shown in FIG. 13, the first arm 1304A, the second arm 1304B, the third arm 1304C, and the fourth arm form a first quadruplet of arms on one side of the clamp 1300 with gaps therebetween, and the fifth arm 1304E, the sixth arm 1304F, the seventh arm 1304G, and the eighth arm 1304H form a first quadruplet of arms on the other side of the clamp 1300 with gaps therebetween. The arms are similarly shaped and form a curve (e.g., curved portion 1308) as they extend from the trailing end 1306A to the leading end 1306B. The arms terminate at a handle 1310 at the leading end 1306B. The handle 1310 includes an opening 1312 and a contact feature 1314. The clamp 1300 also includes opener surfaces 1316A and 1316B on the body 1302. Near the trailing end 1306A, the clamp 1300 includes a slider support surface 1318. The clamp 1300 also includes a shelf 1320. As shown in FIG. 13, the arms extend around at least a portion of the body 1302. Although FIG. 13 shows the arms extending along the clamp in quadruplets, fewer or more arms can be used. For example, additional arms can be used to increase the clamping force of the clamp 1300.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

What is claimed is:

1. An apparatus comprising:
   a slider test socket including:
      a body coupled to an electrical connector, the body extending along a first plane, and
      only a single deflectable arm extending from the body along the first plane and including a free end, wherein the deflectable arm is configured to deflect to receive a slider and to retract to clamp the slider wherein the deflectable arm includes a first portion that extends from the body in a first direction and a second portion that extends in a second direction perpendicular from the first direction, wherein the second portion includes a Y-shaped portion.

2. The apparatus of claim 1, wherein the Y-shaped portion includes a contact feature that extends towards the body.

3. The apparatus of claim 1, wherein the second portion includes a contact feature that extends towards the body.

4. The apparatus of claim 3, wherein the deflectable arm is shaped such that the contact feature moves along a straight line when the deflectable arm is deflected.

5. The apparatus of claim 3, wherein the contact feature is rounded.

6. The apparatus of claim 3, wherein the contact feature is bump-shaped.

7. The apparatus of claim 1, wherein the first portion and the second portion deflect in response to an exerted force on the second portion.

8. The apparatus of claim 1, wherein the deflectable arm and the body form a unitary structure.

9. The apparatus of claim 1, wherein the deflectable arm is substantially L-shaped.

10. The apparatus of claim 1, wherein the deflectable arm forms a clamp space between the deflectable arm and the body.

11. The apparatus of claim 10, further comprising:
    a shelf coupled to the body, wherein the shelf extends towards and below the clamp space.

12. The apparatus of claim 1, wherein the electrical connector includes a flex circuit.

13. The apparatus of claim 1, wherein the electrical connector includes a featherboard.

14. The apparatus of claim 1, further comprising:
a test deck including the slider test socket.

15. The apparatus of claim 14, wherein the test deck includes an access window.

16. The apparatus of claim 15, wherein the access window includes a door configured to be opened to permit a slider to be inserted into or removed from the test deck.

* * * * *